(12) United States Patent
Yamaguchi et al.

(10) Patent No.: US 7,040,797 B1
(45) Date of Patent: May 9, 2006

(54) METHOD OF PRODUCING COMPOSITION COMPRISING THERMOPLASTIC RESIN AND RUBBER

(75) Inventors: Takanari Yamaguchi, Tsukuba (JP); Motonobu Furuta, Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/441,199

(22) Filed: Nov. 16, 1999

(30) Foreign Application Priority Data

Nov. 17, 1998 (JP) ................................. 10-326760

(51) Int. Cl.
*C08L 21/00* (2006.01)

(52) U.S. Cl. .................... 366/76.1; 366/76.3; 525/123; 525/191; 525/418

(58) Field of Classification Search ................ 525/176, 525/123, 191, 418; 366/76.1, 76.3
See application file for complete search history.

(56) References Cited

U.S. PATENT DOCUMENTS

| 4,208,252 | A | | 6/1980 | Yoshida et al. | |
|---|---|---|---|---|---|
| 4,289,409 | A | | 9/1981 | Brand | |
| 4,416,543 | A | | 11/1983 | Brinkmann | |
| 4,584,244 | A | * | 4/1986 | Fenton | 428/407 |
| 5,153,009 | A | | 10/1992 | Voigt | |
| 5,216,073 | A | * | 6/1993 | Haider et al. | 525/66 |
| 5,936,039 | A | * | 8/1999 | Wang et al. | |
| 5,997,765 | A | * | 12/1999 | Furuta et al. | 524/539 |
| 6,165,399 | A | * | 12/2000 | Guntherberg et al. | 264/102 |
| 6,610,786 | B1 | * | 8/2003 | Itoh et al. | 525/191 |

OTHER PUBLICATIONS

Ota et al., translation of JP 06-57008, Mar. 1994.*

* cited by examiner

*Primary Examiner*—Jeffrey Mullis
(74) *Attorney, Agent, or Firm*—Birch, Stewart, Kolasch & Birch, LLP

(57) ABSTRACT

Provided is a method of producing a composition comprising a thermoplastic resin and a rubber, wherein a solid rubber is molten by a rubber kneading machine and fed into an extruder, and the molten rubber is melt-kneaded with the thermoplastic resin in the extruder. The composition has a uniform component ratio and excellent moldability, and can be used widely as raw materials of molded articles, sheets, films and containers.

7 Claims, 1 Drawing Sheet

METHOD OF PRODUCING COMPOSITION COMPRISING THERMOPLASTIC RESIN AND RUBBER

BACKGROUND OF THE INVENTION

1. Field of the Invention

Figure 1:
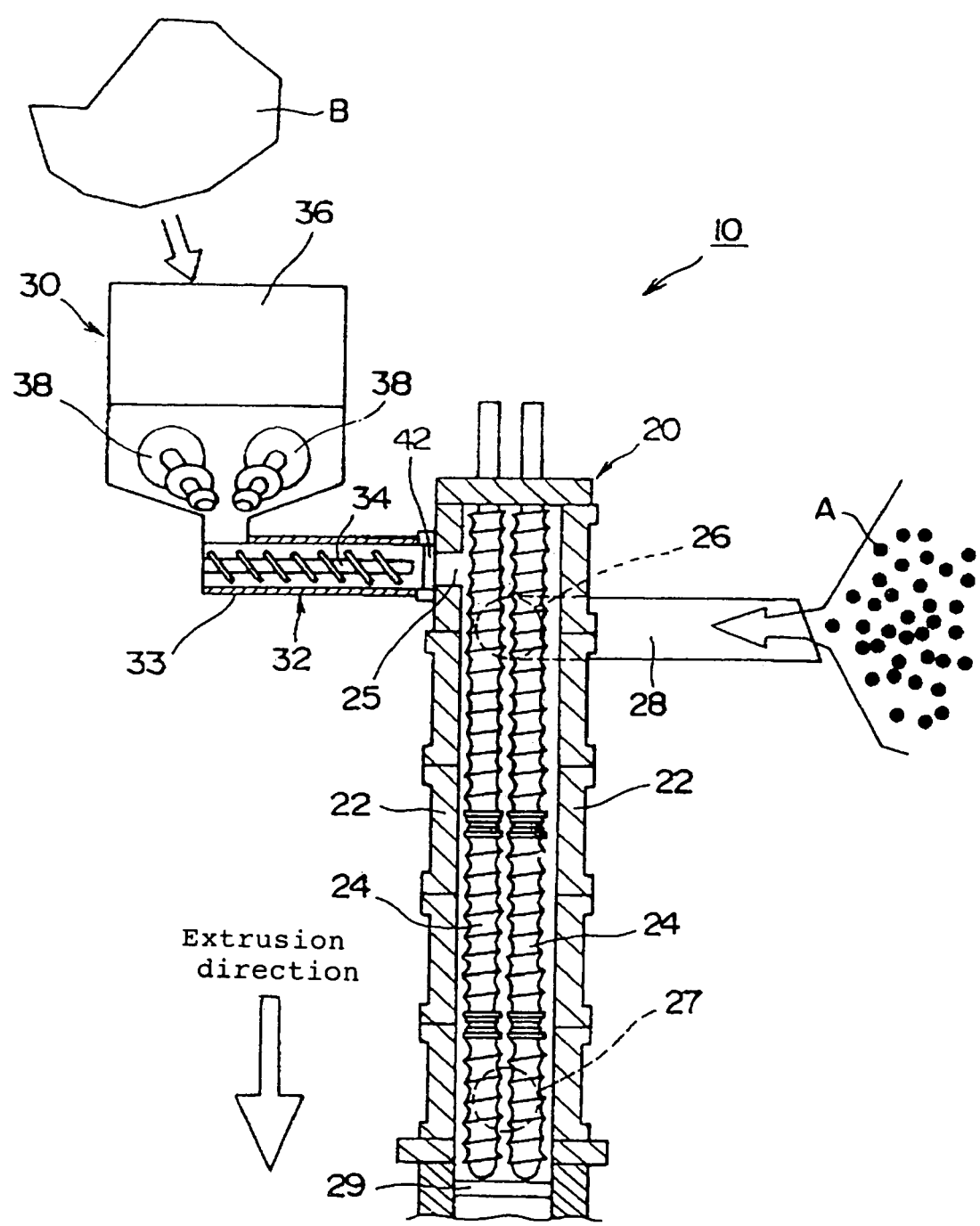

The present invention relates to a method of producing a composition, which is suitable for producing a composition by melt-kneading a thermoplastic resin and a rubber in an extruder, and an extruding equipment.

2. Description of the Related Art

As a composition prepared by compounding a rubber with a thermoplastic resin, for example, a polypropylene composition having an improved impact resistance, which is produced by compounding and melt-kneading polypropylene with a small amount of an ethylene-propylene copolymer rubber, a polystyrene-based composition having an improved impact resistance, which is produced by melt-kneading a polystyrene with mixing a small amount of butadiene rubber, and a polyphenylene ether-based composition having excellent moldability and impact resistance, which is produced by melt-kneading polyphenylene ether and a styrene-butadiene rubber.

Melt-kneading of thermoplastic resin and rubber has been generally conducted by mixing a thermoplastic resin with a rubber and feeding the mixture in a single screw extruder or a twin-screw extruder. The thermoplastic resin is generally used in the form of pellets or powders, while the rubber is used in the form of pellets or finely cut pieces.

In case where a powdered thermoplastic resin and a rubber in the form of pellets or cut pieces are mixed and charged in an extruder, the thermoplastic resin and rubber are not melt-kneaded uniformly in the extruder, thereby causing a problem such as deviation in component ratio of the resulting composition.

SUMMARY OF THE INVENTION

An object of the present invention is to provide a method of producing a composition comprising a thermoplastic resin and a rubber, which has a uniform component ratio, and an extruding equipment.

To attain the above object, the present inventors have studied intensively about melt-kneading of a thermoplastic resin and a rubber in an extruder and found that when the rubber is fed into the extruder in a molten state and then mixed with the thermoplastic resin, the thermoplastic resin and rubber are melt-kneaded uniformly, thus, the present invention has been accomplished.

Thus, the present invention is a method of producing a composition comprising a thermoplastic resin and a rubber, wherein a solid rubber is molten by a rubber kneading machine and fed into an extruder, and the molten rubber is melt-kneaded with the thermoplastic resin in the extruder.

BRIEF DESCRIPTION OF THE DRWAING

FIG. 1 is a block diagram showing one embodiment of an extruder according to the present invention.

The denotations used in the figure are as follows.
10: Extruding equipment
20: Main extruder
25: Rubber feeding portion
26: Resin feeding portion
30: Rubber kneading machine
32: Rubber feeder
36: Hopper
38: Intermeshing screw
42: Filter

DETAILED DESCRIPTION OF THE INVENTION

In a method of producing a composition of the present invention, a rubber is fed into an extruder in a molten state, and melt-kneaded with a thermoplastic resin in the extruder.

By melt-kneading the thermoplastic resin and the molten rubber in the extruder, the thermoplastic resin and rubber are melt-kneaded uniformly. Therefore, deviation in component ratio of the composition comprising the thermoplastic resin and rubber hardly occurs, thereby it is possible to obtain a composition having a uniform component ratio stably.

The temperature at which the rubber is molten is preferably set to a temperature where a melt viscosity of the rubber on extrusion from a nozzle having a diameter of 0.5 mm and a length of 10 mm at a shear rate of 100 $sec^{-1}$ is from 100 to 30000 poise. Thus, the rubber has a viscosity enough to be kneaded, and it is possible to melt-knead the thermoplastic resin and rubber uniformly.

Alternatively, the temperature at which the rubber is molten is preferably set to a temperature at which a melt index of the rubber under a load of 2.16 kgf is from 2 to 20 g/10 minutes. Thus, the resulting rubber has a viscosity enough to be kneaded, thereby making it possible to melt-knead the thermoplastic resin and rubber uniformly.

The feeding portion of the thermoplastic resin to be fed into the extruder is preferably located at a downstream position of the extruder compared with the feeding portion of the rubber. Thus, the temperature of the feeding portion of the rubber becomes lower than that of the feeding portion of the thermoplastic resin. Therefore, when using an engineering plastic or super engineering plastic having a high melting point as the thermoplastic resin, thermal decomposition of the rubber caused by high temperature of the feeding portion of the rubber as well as poor intermeshing of screws of the extruder can be prevented, thereby it is possible to obtain a composition having good appearance.

A bale- or block-like rubber is preferably used as the solid rubber. Poor feeding of the rubber caused by forming of bridge in a hopper, can be prevented.

As the thermoplastic resin, a liquid crystal polymer is preferably used.

By the above described method, a composition comprising the liquid crystal polymer and rubber having uniform component ratio can be obtained.

Further, the present invention provides an extruding equipment, which is used for melt-kneading a thermoplastic resin and a rubber to produce a composition, comprising: a rubber kneading machine for melting a solid rubber; and a main extruder having a resin feeding portion for feeding the thermoplastic resin and a rubber feeding portion for feeding a molten rubber from the rubber kneading machine, which is for melt-kneading the thermoplastic resin and the molten rubber to produce the composition;

the rubber kneading machine comprising a hopper equipped with a pair of intermeshing screws for kneading the solid rubber, and a rubber feeder, wherein the rubber kneaded by the pair of intermeshing screws is further kneaded in the rubber feeder into a molten state and then extruded into the main extruder through the rubber feeding portion of the extruder.

By using the above extruding equipment having a rubber kneading machine and a main extruder, a composition having a uniform component ratio can be obtained efficiently and stably. When the bale- or block-like rubber is fed into the hopper, the rubber is kneaded and molten by the rubber kneading machine comprising a hopper equipped with a pair of intermeshing screws and a rubber feeder effectively. Therefore, it is not necessary to cut the bale- or block-like rubber into fine pieces, thereby making it possible to obtain a composition comprising a thermoplastic resin and a rubber efficiently at low price.

In the above extruding equipment, the resin feeding portion is preferably located at a downstream position of the main extruder compared with the rubber feeding portion. Thus, the temperature of the feeding portion of the rubber can be made lower than that of the feeding portion of the thermoplastic resin. Therefore, even when using an engineering plastic or super engineering plastic having a high melting point as the thermoplastic resin, thermal decomposition of the rubber caused by high temperature of the feeding portion of the rubber as well as poor intermeshing of screws of the extruder can be prevented.

Moreover, a filter for removing undesired foreign materials contained in the molten rubber is preferably provided at a tip portion of the rubber feeder. The undesired foreign materials contained in the rubber are removed before the stage where the thermoplastic resin and rubber are melt-kneaded. Therefore, removal of undesired foreign materials, which may cause so-called uneven and non-melting granular structure of fine granules, can be performed easily.

The filter has preferably a mesh screen of 150 or more, and undesired foreign materials contained in the rubber can be removed effectively.

One preferred embodiment of the present invention is described below with reference to the drawings.

FIG. 1 is a block diagram showing one embodiment of an extruder according to the present invention. In the drawing, an extruding equipment 10 is equipped with a main extruder 20 (a twin-screw extruder) for melt-kneading a thermoplastic resin and a rubber to produce a composition, and a rubber kneading machine 30 for kneading and melting a solid (bale- or block-like) rubber, which is connected to the main extruder 20.

The main extruder 20 comprises a cylinder 22 and two screws 24 rotated by a driving motor (not shown). The cylinder 22 is divided into a plurality of heater blocks and is heated by an external heater (not shown) so that the temperature rises gradually toward an extrusion direction shown by the arrow.

A rubber feeding portion 25 for feeding a molten rubber by the rubber kneading machine 30 is provided on the end side in the direction opposite the extrusion direction of the cylinder 22, while a resin feeding portion 26 for feeding a thermoplastic resin is provided at the slightly downstream side from the rubber feeding portion 25 in the extrusion direction. The resin feeding portion 26 is provided, for example, with a quantitative feeder 28 for quantitatively feeding the thermoplastic resin in the form of pellets or powders.

A deaeration port 27 for performing vacuum deaeration using a vacuum pump is provided at the end of the side of the extrusion direction of the cylinder 22. A nozzle for extruding a strand (not shown) is connected with the end of the side of the extrusion direction of the cylinder 22 via a filter 29. The filter 29 is a filter made of a stainless steel having a mesh screen of about 100 and is used for removing undesired foreign materials contained in the composition comprising the thermoplastic resin and rubber produced by melt-kneading in the main extruder 20.

A rubber kneading machine 30 comprises a rubber feeder 32 (a single screw extruder) connected with the rubber feeding portion 25 of the main extruder 20, a hopper 36 into which a bale- or block-like rubber is charged, which is provided at the end opposite the rubber feeding portion 25 of the rubber feeder 32, and a pair of intermeshing screws 38 for kneading and feeding the bale- or block-like rubber charged into the hopper 36 into the rubber feeder 32, which is provided at a lower portion of the hopper 36.

The rubber feeder 32 comprises a cylinder 32 to be heated by an external heater (not shown) and a screw 34 rotated by a driving motor (not shown), where the rubber kneaded by intermeshing screws 38 is converted into a molten state by further kneading and fed into the main extruder 20. The screw 34 is preferably composed of a full-flight system.

A filter 42 for removing undesired foreign materials in the rubber is provided at the end of the side of the rubber feeding portion 25 of the rubber feeder 32. This filter 42 is a filter having a mesh screen of 50 or more, which is made of a stainless steel. To effectively remove undesired foreign materials contained in the rubber and to prevent poor production efficiency of the composition due to large pressure loss, it is preferred to use a filter of 180–600 mesh screen as the filter 42, more preferably a filter of 200–470 mesh screen.

The intermeshing screws 38 are tapered screws rotated by a driving motor (not shown) and are provided in a tapering shape so that its tip faces the connection portion of the hopper 36 and rubber feeder 32. The intermeshing screws 38 are heated by an external heater (not shown).

The hopper 36 can be heated, if necessary. The hopper 36 is connected with a nitrogen introducing pipe, thereby it is possible to introduce nitrogen into the hopper 36 from the exterior.

The method of producing a composition using the extruding equipment 10 having the above construction is described below.

First, a thermoplastic resin (hereinafter referred to as a component (A), sometimes) and a rubber (hereinafter referred to as a component (B), sometimes) to be used in the production of the above composition are described.

The thermoplastic resin used in the present invention includes at least one selected from commodity resins such as polyolefin, polystyrene, ethylene-vinyl acetate copolymer, polyvinyl chloride, polyvinylidene chloride, acrylic resin, polyvinyl alcohol, ABS resin, As resin, etc., engineering plastic, and super engineering plastic.

As the polyolefin, a homopolymer or copolymer such as olefin or diolefin having 2 to 20 carbon atoms can be used. Specific examples of the olefin and diolefin include ethylene, propylene, butene-1, pentene-1, hexene-1, heptene-1. octene-1, nonene-1, decene-1, hexadecene-1, eicosene-1, 4-methylpentene-1,5-methyl-2-pentene-1 and the like. Specific examples of the polyolefin include low-density polyethylene, high-density polyethylene, polypropylene, poly-1-butene, poly-4-methylpentene-1, ethylene/butene-1 copolymer, ethylene/4-methylpentene-1 copolymer, ethylene/hexene-1 copolymer, propylene/ethylene copolymer, propylene/butene-1 copolymer and the like.

The engineering plastic includes polycarbonate, polyester, polyacetal, polyamide, polyphenylene ether and the like.

The polyester includes polycondensate of divalent carboxylic acid and divalent alcohol, and preferably polycondensate of aromatic dicarboxylic acid and alkylene glycol. Specific examples thereof include polyethylene terephthalate, polybutylene terephthalate and the like.

The polyamide includes, for example, polycondensate of divalent carboxylic acid and divalent amine, and specific examples of the polyester include polyamide 6, polyamide 12, polyamide 11, polyamide 6-6, polyamide 6-12, polyamide MXD6 and the like.

The super engineering plastic refers to a plastic having higher heat resistance than that of the engineering plastic, and examples thereof include polysulfone, polyamideimide, polyacrylate, polyether amide, polyphenylene sulfide, liquid crystal polymer (e.g. liquid crystal polyester, liquid crystal amide, liquid crystal polyester imide, etc.), polyether ether ketone, polyether sulfone, and polytetrafluoroethylene. Among these super engineering plastics, liquid crystal polyester is used particularly preferably.

The rubber used as another constituent component (B) of the composition refers to a polymer substance having a rubber elasticity at room temperature described in New Polymer Dictionary (edited by THE SOCIETY OF POLYMER SCIENCE, JAPAN, published on 1988, Asakura Shoten). Specific examples thereof include natural rubber, butadiene polymer, butadiene-styrene copolymer (including random copolymer, block copolymer such as SEBS rubber or SBS rubber, and graft copolymer) or hydrogenated substance thereof, isoprene polymer, chlorobutadiene polymer, butadiene-acrylonitrile copolymer, isobutylene polymer, isobutylene-butadiene copolymer rubber, isobutylene-isobutylene copolymer, acrylate-ethylene copolymer rubber, ethylene-propylene copolymer rubber, ethylene-butene copolymer rubber, ethylene-propylene-styrene copolymer rubber, styrene-isoprene copolymer rubber, styrene-butylene copolymer, styrene-ethylene-propylene copolymer rubber, perfluororubber, fluororubber, chloroprene rubber, butyl rubber, silicone rubber, ethylene-propylene-nonconjugated diene copolymer rubber, thiol rubber, polysulfide rubber, polyurethane rubber, polyether rubber (e.g. polypropylene oxide, etc.), epichlorohydrin rubber, polyester elastomer, polyamide elastomer and the like. Among them, acrylic rubber, butadiene-styrene copolymer or hydrogenated substance thereof, and acrylate-ethylene copolymer are preferably used and (meth)acrylate-ethylene copolymer rubber is more preferable.

These rubber may be those produced by using any catalyst (e.g. peroxide, trialkylaluminum, lithium halide, nickel catalyst, etc.) according to any method (e.g. emulsion polymerization method, solution polymerization method, etc.).

In the embodiment of the present invention, when the component (A) is a super engineering plastic requiring very high melt-kneading temperature, the component (B) is preferably a rubber containing a functional group having the reactivity with the super engineering plastic. When using a liquid crystal polyester as the super engineering plastic, the functional group having the reactivity with the liquid crystal polyester in the component (B) is preferably an oxazolyl group, epoxy group or amino group. Among them, epoxy group is most preferred. The epoxy group may also be present as a part of the other functional groups, and examples thereof include glycidyl group.

When the component (A) is a super engineering plastic, the presence of such a functional group in the component (B) leads to more homogeneous mixing of the component (A) and component (B).

When the component (A) is a commodity plastic or engineering plastic, such a functional group may also be contained in the component (B), according to requirements.

The method of introducing the functional group having a reactivity with the thermoplastic resin as the component (A) is not specifically limited, and may be a known method. For example, a monomer having a reactivity with the thermoplastic resin can be introduced by copolymerization in a stage of synthesizing a rubber, and a monomer having a reactivity with the thermoplastic resin can also be graft-copolymerized with the rubber.

As the monomer containing a functional group having a reactivity with the thermoplastic resin, especially polyester, liquid crystal polyester, etc., for example, unsaturated carboxylic acid glycidyl ester and unsaturated glycidyl ether are preferably used. The rubber containing a functional group having a reactivity with the liquid crystal polyester is preferably a copolymer rubber containing an unsaturated carboxylic acid glycidyl ester unit and/or an unsaturated glycidyl ether unit.

The unsaturated carboxylic acid glycidyl ester is preferably a compound represented by the general formula:

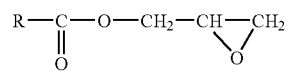

wherein R is a $C_2-C_{13}$ hydrocarbon group having an ethylenically unsaturated bond.

The unsaturated glycidyl ether is preferably a compound represented by the general formula:

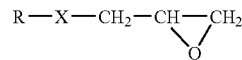

wherein R is a $C_2-C_{18}$ hydrocarbon group having an ethylenically unsaturated bond, and X is $-CH_2O-$ or

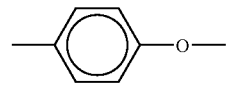

Specific examples of the unsaturated carboxylic acid glycidyl ester include glycidyl acrylate, glycidyl methacrylate, diglycidyl itaconate, triglycidyl butenetricarboxylate, glycidyl p-styrenecarboxylate and the like.

Specific examples of the unsaturated glycidyl ether include vinyl glycidyl ether, allyl glycidyl ether, 2-methylallyl glycidyl ether, methacryl glycidyl ether, styrene-p-glycidyl ether and the like.

Preferred specific examples of the rubber containing a functional group having the reactivity include (meth)acrylate-ethylene-(unsaturated carboxylic acid glycidyl ester and/or unsaturated glycidyl ether) copolymer rubber.

The (meth)acrylate is an ester obtained from acrylic or methacrylic acid and an alcohol. The alcohol is preferably an alcohol having 1 to 8 carbon atoms. Specific examples of the (meth)acrylate include methyl acrylate, methyl methacrylate, n-butyl acrylate, n-butyl methacrylate, tert-butyl acrylate, tert-butyl methacrylate, 2-ethylhexyl acrylate, 2-ethylhexyl methacrylate and the like. These (meth)acrylates may be used alone, or two or more kinds of them may also be used in combination.

The above (meth)acrylate-ethylene-(unsaturated carboxylic acid glycidyl ester and/or unsaturated glycidyl ether) copolymer rubber can be produced, for example, by bulk polymerization, emulsion polymerization or solution polymerization using a free radical initiator. Typical polymerization method includes methods described in Japanese Patent Publication No. 45085/1971 and Japanese Patent Publication (Laid-Open) No. 127709/1986, and the above copolymer rubber can be produced under the conditions of a pressure of not less than 500 kg/cm$^2$ and a temperature of 40 to 300° C. in the presence of a polymerization initiator capable of producing a free radical.

The other rubber used in the present invention includes, for example, acrylic rubber having an epoxy group, vinyl aromatic hydrocarbon compound-conjugated diene compound block copolymer rubber having an epoxy group or the like.

The acrylic rubber as used herein is preferably one containing, as a principal component, at least one monomer selected from compounds represented by the general formula (1):

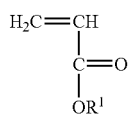

(1)

wherein R$^1$ represents an alkyl or cyanoalkyl group having 1 to 18 carbon atoms, the general formula (2):

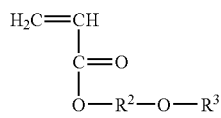

(2)

wherein R$^2$ represents an alkylene group having 1 to 12 carbon atoms, and R$^3$ represents an alkyl group having 1 to 12 carbon atoms, and the general formula (3):

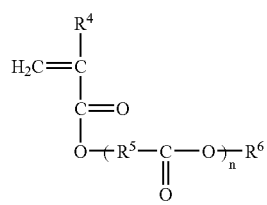

(3)

wherein R$^4$ represents hydrogen atom or a methyl group, R$^5$ represents an alkylene group having 3 to 30 carbon atoms, R$^6$ represents an alkyl group having 1 to 20 carbon atoms or a derivative thereof, and n represents an integer of 1 to 20.

Specific examples of the alkyl acrylate represented by the above general formula (1) include methyl acrylate, ethyl acrylate, propyl acrylate, butyl acrylate, pentyl acrylate, hexyl acrylate, actyl acrylate, 2-ethylhexyl acrylate, nonyl acrylate, decyl acrylate, dodecyl acrylate, cyanoethyl acrylate and the like.

The alkoxyalkyl acrylate represented by the above general formula (2) includes, for example, methoxyethyl acrylate, ethoxyethyl acrylate, butoxyethyl acrylate, ethoxypropyl acrylate and the like. One or more kinds of them can be used as a principal component of the acrylic rubber.

As a constituent component of the acrylic rubber, a unsaturated monomer copolymerizable with at least one monomer selected from the compounds represented by the above general formulas (1) to (3) can be used, according to requirements.

Examples of the unsaturated monomer include styrene, α-methylstyrene, acrylonitrile, halogenated styrene, methacrylonitrile, acrylamide, methacrylamide, vinyl naphthalene, N-methylol acrylamide, vinyl acetate, vinyl chloride, vinylidene chloride, benzyl acrylate, methacrylic acid, itaconic acid, fumaric acid, maleic acid and the like.

The method of producing the above acrylic rubber is not specifically limited and there can be used known polymerization methods described, for example, in Japanese Patent Publication (Laid-Open) Nos. 113010/1984, 64809/1987 and 160008/1991 and WO95/04764. The acrylic rubber can be produced by emulsion polymerization, suspension polymerization, solution polymerization or bulk polymerization in the presence of a radical initiator.

The vinyl aromatic hydrocarbon compound-conjugated diene compound block copolymer rubber, which contains a functional group having the reactivity with the thermoplastic resin, is preferably a rubber obtained by epoxidation of a block copolymer composed of (a) sequence containing exclusively a vinyl aromatic hydrocarbon compound and (b) sequence containing exclusively a conjugated diene compound, or a rubber obtained by epoxidation of a hydrogenated substance of the block copolymer.

The vinyl aromatic hydrocarbon compound-conjugated diene compound block copolymer or a hydrogenated substance thereof can be produced by a known method which is described, for example, in Japanese Patent Publication No. 23798/1965 and Japanese Patent Publication (Laid-open) No. 133203/1984.

Examples of the aromatic hydrocarbon compound include styrene, vinyl toluene, divinyl benzene, α-methyl styrene, p-methyl styrene, vinyl naphthalene and the like. Among them, styrene is preferred.

Examples of the conjugated diene compound include butadiene, isoprene, pyrelylene, 1,3-pentadiene, 3-butyl-1, 3-octadiene and the like. Among them, butadiene or isoprene is preferred.

As the rubber in the present invention, those having a Mooney viscosity of 3 to 70 are preferred, those having Mooney viscosity of 3 to 30 are more preferred, and those having a Mooney viscosity of 4 to 25 are particularly preferred. The Mooney viscosity as used herein refers to a value measured by using a 100° C. large rotor in accordance with JIS K6300.

As the rubber used in the present invention, those having a heat of fusion of smaller than 3 J/g are preferred because of excellent thermal stability. The heat of fusion of the crystal is measured by heating from −150 to 100° C. at a rate of 20° C./minutes according to a DSC method.

The rubber used in the present invention can be used as a vulcanized rubber after vulcanizing optionally. The vulcanization of the (meth)acrylate-ethylene-(unsaturated carboxylic acid glycidyl ester and/or unsaturated glycidyl ether) copolymer rubber is attained by using a polyfunctional organic acid, a polyfunctional amine compound and an imidazole compound, but are not limited thereto.

Preferred aspect of the composition is a resin composition wherein the thermoplastic res in as the component (A) is a continuous phase and the rubber as the component (B) is a dispersed phase. When the thermoplastic resin is not a continuous phase, the moldability and mechanical strength of the thermoplastic resin are drastically lowered, sometimes, which is not preferred.

Preferred aspect of the composition is a composition comprising 56.0–99.9% by weight, preferably 65.0–99.9% by weight, more preferably 70–98% by weight of the component (A), and 44.0–0.1% by weight, preferably 35.0–0.1% by weight, more preferably 30–2% by weight of the component (A).

The method of producing the composition comprising the component (A) and component (B) is described below.

First, the temperature of the rubber feeder 32 and intermeshing screws 38 of the main extruder 20 and rubber kneading machine 30 is previously set to a predetermined temperature by an external heater (not shown).

At this time, the temperature of the rubber feeder 32 and intermeshing screws 38 is preferably set to the temperature at which a melt viscosity of the rubber on extrusion from a nozzle having a diameter of 0.5 mm and a length of 10 mm at a shear rate of 100 $sec^{-1}$ is from 100 to 30000 poise, thereby to obtain a viscosity sufficiently enough to knead the rubber. To obtain a rubber having a viscosity enough to knead, more effectively, the temperature is more preferably set to the temperature at which a melt viscosity of the rubber on extrusion from a nozzle having a diameter of 0.5 mm and a length of 10 mm at a shear rate of 100 $sec^{-1}$ is from 700 to 20000 poise, and most preferably 1000 to 10000 poise.

A convenient method of setting the temperature to obtain the viscosity of the rubber is a method of setting the temperature of the rubber feeder 32 and intermeshing screws 38 to a temperature at which as melt index (abbreviated to MI or MFR) of the rubber is preferably 2 to 20 g/10 minutes, and more preferably 4 to 12 g/10 minutes. The melt index as used herein refers to an amount (number of grams) of the rubber to be extruded per 10 minutes, which is measured at a fixed temperature under a fixed load (2.16 kgf) in accordance with JIS K7210. The temperature at which the melt index under the load of 2.16 kgf is 4 to 12 g/10 minutes varies depending on the kind of the rubber.

The temperature of the rubber feeding portion 25 in the main extruder 20 is set to the same temperature as that in the case of the rubber feeder 32, while the temperature of the resin feeding portion 26 is set to the melting point of the thermoplastic resin.

After the temperature of the rubber feeder 32 and intermeshing screws 38 was set as above, a calibration curve showing a relation between the number of revolutions of the rubber feeder 32 and extrusion amount of the rubber is previously prepared so as to feed an optimum amount of the rubber (b) into the hopper 36 of the rubber kneading machine 30. Then, a predetermined amount of the bale- or block-like rubber (B) obtained in accordance with this calibration curve is charged in the hopper 36. Consequently, the rubber (B) is melt-kneaded by the intermeshing screws 38 and fed into the rubber feeder 32, where the rubber (32) is further melt-kneaded by a screw 34 of the rubber feeder 32, extruded and then fed into the main extruder 20 through the rubber feeding portion 25. At this time, undesired foreign materials contained in the rubber (B) are removed by a filter 42 and then the rubber (B) is fed into the main extruder 20.

Then, the thermoplastic resin (A) in the form of pellets or powders is charged in the main extruder 20 through a quantitative feeder 28. Consequently, the thermoplastic resin (A) and rubber (B) in a molten state are melt-kneaded by twin-screws 24 to produce a composition comprising the thermoplastic resin (A) and rubber (B), which is extruded toward a nozzle for molding a strand (not shown). The melt-kneading temperature of the composition can be appropriately set depending on the kind of the thermoplastic resin (A) and component ratio of the composition, but is preferably from 200 to 360° C.

In the production of the composition, inorganic fillers are optionally used. Examples of the inorganic filler include calcium carbonate, talc, clay, silica, magnesium carbonate, barium sulfate, titanium oxide, alumina, gypsum, glass flake, glass fiber, carbon fiber, alumina fiber, silica alumina fiber, aluminum borate whisker, potassium titanate fiber and the like.

In the composition of the present invention, there can be further added various additives such as organic fillers, antioxidants, heat stabilizers, photostabilizers, flame retardants, lubricants, antistatic agents, inorganic or organic colorants, rust preventives, crosslinking agents, foaming agents, fluorescent agents, surface smoothening agents, surface gloss modifiers, release modifiers such as fluororesin and the like, according to requirements.

These fillers and additives are charged into the main extruder 20 through the feeding portion provided at a proper position of the main extruder 20, or may be fed into the main extruder 20 after previously mixing with the thermoplastic resin (A) and/or rubber (B).

As described above, the composition was produced by melting the solid rubber using the rubber kneading machine 30, feeding this rubber in the molten state and thermoplastic resin into the main extruder 20 and melt-kneading them. Thus, the thermoplastic resin and rubber are uniformly melt-kneaded and deviation in component ratio of the composition comprising the thermoplastic resin and rubber hardly occurs, thereby making it possible to stably obtain a composition having a uniform component ratio.

Since the solid rubber is molten by the rubber kneading machine 30 comprising the rubber feeder 32 and a pair of intermeshing screws 38, it is not necessary to cut the bale- or block-like rubber into fine pieces, thereby making it possible to obtain the rubber composition comprising the thermoplastic resin and rubber efficiently at low price. The solid rubber can also be fed quantitatively into the main extruder 20.

Furthermore, the rubber molten by the rubber kneading machine 30 is fed through the rubber feeding portion 25 of the main extruder 20 and the thermoplastic resin is fed through the resin feeding portion 26 at the downstream side in the extrusion direction, whose temperature is higher than that of the rubber feeding portion 25. Therefore, thermal decomposition of the rubber caused by a high temperature of the feeding portion of the rubber as well as poor intermeshing of screws 24,24 of the main extruder 20 can be prevented, thereby making it possible to obtain a composition having good appearance.

Since the filter 42 is provided in the rubber feeder 32, undesired foreign materials contained in the rubber are removed before the stage where the thermoplastic resin and rubber are kneaded, thereby making it possible to easily remove undesired foreign materials, which can cause so-called uneven and non-melting granular structure of fine granules.

Furthermore, since the bale- or block-like rubber can be used as the solid rubber, poor feeding of the rubber caused by forming of bridge in the hopper 36, can be prevented.

As the main extruder 20, a single-screw extruder can be used as well as a twin-screw extruder.

As the rubber feeder 32, a twin-screw extruder can be used as well as a single-screw extruder.

Filter 42 can be provided in the rubber feeder 30 according to requirements. Filter 29 can also be provided in the main extruder 20 according to requirements.

EXAMPLES

The following Examples further illustrate the present invention but are not to be construed to limit the scope thereof.

Components to be Used
(1) Thermoplastic resin as component (A)
   (a) Aromatic polycarbonate
      Trade name: CALIBER 3000-4
      Melt index (temperature, 300° C.; load, 1.2 kg): 4 g/10 minutes
      Manufactured by Sumitomo Dow Co., Ltd.
      This resin is abbreviated to a-1 hereinafter.
   (b) Liquid crystal polyester
      Trade name: Sumika Super LCP E6000
      Manufactured by Sumitomo Chemical Co., Ltd.
      This resin is abbreviated to a-2 hereinafter.
(2) Thermoplastic resin as component (B)
   (a) Epoxy group-containing acrylic rubber AR31
      Melt index (temperature, 160° C.; load: 2.16 kg): 6.5 g/10 minutes
      Mooney viscosity=36
      Manufactured by NIPPON ZEON Co., Ltd.
      This resin is abbreviated to b-1 hereinafter.
   (b) Epoxy group-containing ethylene-acrylate copolymer rubber
      Esprene EMA2752
      Melt index (temperature, 190° C.; load: 2.16 kg): 9.8 g/10 minutes
      Mooney viscosity=16,
      Manufactured by Sumitomo Chemical Co., Ltd.
      This resin is abbreviated to b-2 hereinafter.

Example 1

For the purpose of obtaining a composition having (a-1)/(b-1) of 9/1 (weight ratio), a test was conducted by using an extruding equipment 10 as shown in FIG. 1.

As a main extruder 20, for example, a twin-screw extruder of a kneading disc system (diameter of a screw 24: 30 mm, ratio of screw length L of screw 24 to pore diameter D of cylinder 22, L/D: 42) was used.

A rubber kneading machine 30 is composed of a hopper 36 having a volume of 4 liter, a pair of tapered intermeshing screws 38 each having an upper diameter of 100 mm and a lower diameter of 20 mm, and a rubber feeder 32 as a full-flight type single screw extruder (diameter of a screw 34: 35 mm, L/D: 42), and the rubber feeder 32 is connected to the rubber feeding portion 25 of the main extruder 20. A filter 42 has a mesh screen of 200.

A bale-like b-1 as a component (B) was charged in the hopper 36 under a nitrogen atmosphere, kneaded by the intermeshing screws 38 heated to 160° C. at 3 rpm, and then melt-kneaded in the rubber feeder 32 heated to 160° C. at 30 rpm. This molten b-1 was fed in the main extruder 20 through the rubber feeding portion 25. In the main extruder 20, the periphery of the rubber feeding portion 25 was heated to 160° C. and the downstream side from the rubber feeding portion 25 was heated to 300° C., while the number of revolutions of the screw 24 was controlled to 150 rpm.

On the other hand, a-1 in the form of pellets as a component (A) was fed in the main extruder 20 through a quantitative feeder 28 of the main extruder 20. At this time, vacuum deaeration through a deaeration port 27 was also conducted by using a vacuum pump.

The component (A) and component (B) were melt-kneaded and a strand (composition) was extruded through an extruder nozzle of the main extruder 20. This strand was passed through a water bath having a length of 2 m and, after removing water adhered on the pellets using a blower, the strand was cut into pieces using a strand cutter to obtain pellets.

Thus, pellets of a composition whose component ratio (a-1)/(b-1) measured by a specific gravity is 9/1 were obtained. During the melt-kneading, blister of the resin did not occur and pellets of a composition having good appearance was obtained.

Example 2

For the purpose of obtaining a composition having (a-2)/(b-2) of 8/2 (weight ratio), a test was conducted. The same equipment as in Example 1 was used as the main extruder 20 and rubber kneading machine.

A bale-like b-2 as a component (B) was charged in the hopper 36 under a nitrogen atmosphere, kneaded by the intermeshing screws 38 heated to 180° C. at 5 rpm, and then melt-kneaded in the rubber feeder 32 heated to 190° C. at 32 rpm. This molten b-2 was fed in the main extruder 20 through the rubber feeding portion 25. In the main extruder 20, the periphery of the rubber feeding portion 25 was heated to 190° C. and the downstream side from the rubber feeding portion 25 was heated to 340° C., while the number of revolutions of the screw 24 was controlled to 250 rpm.

On the other hand, a-2 in the form of pellets as a component (A) was feed in the main extruder 20 through a quantitative feeder 28 of the main extruder 20 in the same manner as in Example 1. At this time, vacuum deaeration in the main extruder 20 was also conducted in the same manner as in Example 1.

The component (A) and component (B) were melt-kneaded and a strand (composition) was extruded through an extruder nozzle of the main extruder 20. This strand was passed through a water bath having a length of 2 m and, after removing water adhered on the pellets using a blower, the strand was cut into pieces using a strand cutter to obtain pellets.

Thus, pellets of a composition whose component ratio (a-2)/(b-2) measured by a specific gravity is 8/2 were obtained. During the melt-kneading, blister of the resin did not occur and pellets of a composition having good appearance was obtained.

Comparative Example 1

The rubber used in Example 1 was cut into pieces of about 1 cm square and then charged in a twin-screw extruder TEX-30 using a screw feeder. As a result, the cut rubber pieces were adhered to the screw feeder and a quantitative feed could not be performed. Therefore, when the thermoplastic resin and rubber were melt-kneaded in the extruder to produce pellets of the composition, deviation in component ratio of the composition occurred.

Comparative Example 2

In the same manner as in Example 2, except that the temperature of the intermeshing screws 38 was set to room temperature and the temperature in the rubber feeder 32 was set to 100° C., the melt-kneading was conducted. As a result, the component (B) was not fed quantitatively through the rubber feeding portion 25 and the component ratio was changed drastically in the system and, therefore, a uniform composition could not be produced. During the melt-kneading, blister caused probably by thermal decomposition of the rubber was recognized.

According to the present invention, in case where the composition comprising a thermoplastic resin and a rubber is produced, a composition having a uniform component ratio can be obtained stably without causing deviation in component ratio of the composition. It is not necessary to cut a solid rubber into fine pieces and, therefore, the composition can be obtained efficiently at low price.

Accordingly, such a composition can be used widely as raw materials of molded articles, sheets, films and containers in the field of industry, thereby making it possible to meet such a market's request that a composition having excellent moldability is obtained by mixing a rubber with a thermoplastic resin including a super engineering plastic and especially liquid crystal polymer.

What is claimed is:

1. A method of producing a composition comprising a thermoplastic liquid crystal polymer and a rubber, wherein a solid rubber is turned into a molten rubber by a rubber kneading machine and the molten rubber is fed into an extruder from the rubber kneading machine, and in the extruder the molten rubber is melt-kneaded with the thermoplastic liquid crystal polymer.

2. The method of producing a composition according to claim 1, wherein the rubber is molten:

at a temperature where the viscosity of the rubber on extrusion from a nozzle having a diameter of 0.5 mm and a length of 10 mm at a shear rate of 100 sec$^{-1}$ is from 100 to 30000 poise; or at a temperature where a melt index of the rubber under a load of 2.16 kgf is from 2 to 20 g/10 minutes.

3. The method of producing a composition according to claim 1, wherein the thermoplastic liquid crystal polymer is fed at a downstream position of the extruder relative to the position at which the molten rubber is fed.

4. The method of producing a composition according to claim 1, wherein the solid rubber has a shape of bale or block.

5. A method of producing a composition comprising a thermoplastic liquid crystal polymer and a rubber, wherein a solid rubber is turned into a molten rubber by a rubber kneading machine and the molten rubber is fed into an extruder from the rubber kneading machine, and in the extruder the molten rubber is melt-kneaded with the thermoplastic liquid crystal polymer wherein the rubber is molten:

at a temperature where the viscosity of the rubber on extrusion from a nozzle having a diameter of 0.5 mm and a length of 10 mm at a shear rate of 100 sec$^{-1}$ is from 100 to 30000 poise; or at a temperature where a melt index of the rubber under a load of 2.16 kfg is from 2 to 20 g/10 minutes.

6. The method of producing a composition according to claim 5, wherein the thermoplastic liquid crystal polymer is fed at a downstream position of the extruder relative to the position at which the molten rubber is fed.

7. The method of producing a composition according to claim 5, wherein the solid rubber has a shape of bale or block.

* * * * *